United States Patent [19]
Kim

[11] Patent Number: 5,971,679
[45] Date of Patent: Oct. 26, 1999

[54] SPLASH GUARD DEVICE FOR USE IN A MACHINE TOOL

[75] Inventor: Jong Ik Kim, Kyongnam, Rep. of Korea

[73] Assignee: Daewoo Heavy Industries, Ltd., Incheon, Rep. of Korea

[21] Appl. No.: 09/221,879

[22] Filed: Dec. 29, 1998

[30] Foreign Application Priority Data

Dec. 31, 1997 [KR] Rep. of Korea .................. 97-45551 U

[51] Int. Cl.⁶ .................................................. B23Q 11/08
[52] U.S. Cl. ...................................... 409/134; 408/241 G
[58] Field of Search ................................ 74/608; 408/56, 408/234, 241 G; 409/134, 136, 135

[56] References Cited

U.S. PATENT DOCUMENTS

| | | | |
|---|---|---|---|
| 4,863,319 | 9/1989 | Winkler et al. | 409/134 |
| 5,342,156 | 8/1994 | Baba | 409/134 |
| 5,364,210 | 11/1994 | Rutschle et al. | 409/134 |
| 5,531,004 | 7/1996 | Ahn . | |
| 5,658,105 | 8/1997 | Takahashi | 409/134 |

FOREIGN PATENT DOCUMENTS 2-34739  8/1990  Japan .

*Primary Examiner*—Daniel W. Howell
*Attorney, Agent, or Firm*—Staas & Halsey

[57] ABSTRACT

A splash guard device is utilized in a machine tool to prevent chips and coolant from flying to the outside of a cutting compartment, while permitting smooth pallet changing operation. The splash guard device includes a splash guard door capable of up/down movement and swivellable about a vertical swivel axis in the course of pallet changing operation and an elevationally movable top sealing member having a lowered position in which it remains in contact with the top edge of the splash guard door and a raised position in which it is spaced apart from the top edge of the splash guard door. Responsive to the upward movement of the splash guard door, a linkage mechanism is adapted to cause the top sealing member to move from the lowered position into the raised position. A pair of fixed side splash guard walls extend in a spaced-apart parallel relationship with respect to the corresponding side edge of the splash guard door. Mounted on the respective one of the side splash guard walls are a pair of side sealing rods which are laterally displaceable toward and away from the splash guard door between an extended sealing position and a retracted non-sealing position.

11 Claims, 5 Drawing Sheets

SPLASH GUARD DEVICE FOR USE IN A MACHINE TOOL

FIELD OF THE INVENTION

The present invention relates generally to a machine tool and more specifically to a splash guard device for use in a machine tool which includes a splash guard door swivellable about a vertical swivel axis simultaneously with pallet changing operation and capable of preventing metal chips and coolant from flying over the upper and opposite side edges of the door during the course of workpiece cutting operation.

DESCRIPTION OF THE PRIOR ART

Conventional machine tools make use of an automatic pallet changer, often referred to as "APC" by its acronym, which can change a pair of workpiece supporting pallets between a mounting position and a machining position each time the cutting operation for one workpiece comes to an end. The cutting operation is carried out within a machining compartment surrounded by a machine housing.

As disclosed in U.S. Pat. No. 5,531,004 to Ahn, a typical machining center has an access opening in front of a machining compartment, the access opening being openably closed by a rotary door so that chips and coolant can be inhibited from flying out of the machining compartment in a workpiece cutting process. In order to change a pair of pallets respectively located at a mounting position and a machining position, an automatic pallet changer is adapted to first bring the rotary door into a raised position, after which the rotary door will be swivelled 180° about a center swivel axis and at the same time the pallet located at the mounting position will be changed with the one placed at the machining position.

Since a gap is necessarily present around the top and opposite side edges of the rotary door to assure smooth swivelling thereof, the machining center of the '004 patent has a drawback that chips and coolant may fly over the edges of the rotary door, thus contaminating the workpiece mounting area outside the machine housing. As a solution to this drawback, Japanese Patent Publication No. 2-34739 published on Aug. 6, 1990 teaches a machine tool splash guard arrangement comprising a vertical partition cover swivellable about a center support shaft operatively connected to a pallet changer, an elevationally movable top sealing plate sealingly engageable with the top edge of the partition cover, a link mechanism responsive to the upward movement of the support shaft for causing the top sealing plate to move upward in such a manner as to leave a gap between the top edge of the partition cover and the top sealing plate, and a pair of opposite side sealing plates sealingly engageable with the side edges of the partition cover, each of the side sealing plates rotatable into an open position out of engagement with the partition cover in response to the upward movement of the support shaft.

The machine tool splash guard arrangement dislosed in the Japanese Patent Publication has an advantage in that the top and side sealing plates can prevent chips and coolant from flying over the top and side edges of the partition cover, while allowing the partition cover to swivel without the likelihood of physical interference or contact with the environmentally disposed sealing plates at the time of pallet changing operation. A shortcoming encountered in the machine tool splash guard arrangement mentioned just above is that the linkage for operatively connecting the support shaft to the top and side sealing plates is highly complicated in structure, costly to manufacture and susceptible to unwanted malfunction. The desirability of providing a splash guard device capable of removing such and other shortcomings is the premise on which the invention was made.

SUMMARY OF THE INVENTION

An object of the invention is to provide a splash guard device for use in a machine tool which can prevent chips and coolant from flying to the outside during the course of workpiece cutting operation, while assuring smooth pallet changing operation before and after the workpiece is machined.

Another object of the invention is to provide a splash guard device for use in a machine tool which can reduce complexity of the machine tool and is manufacturable with ease in a cost-effective manner.

With the above objects in view, the present invention resides in a splash guard device for use in a machine tool, comprising: a splash guard door capable of up/down movement and swivellable about a vertical swivel axis, the door having a top edge and opposite side edges; an elevationally movable top sealing member having a lowered position in which the top sealing member remains in contact with the top edge of the splash guard door and a raised position in which the top sealing member is spaced apart from the top edge of the splash guard door; linkage means responsive to the upward movement of the splash guard door for causing the top sealing member to move from the lowered position into the raised position; a pair of fixed side splash guard walls each extending in a spaced-apart parallel relationship with respect to the corresponding side edge of the splash guard door; and a pair of side sealing members each mounted on the respective one of the side splash guard walls and laterally displaceable toward and away from the splash guard door between an extended sealing position in which each of the side sealing members makes close contact with the corresponding side edge of the splash guard door and a retracted position in which each of the side sealing members is spaced apart from the corresponding side edge of the splash guard door.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENT

Figure 1:
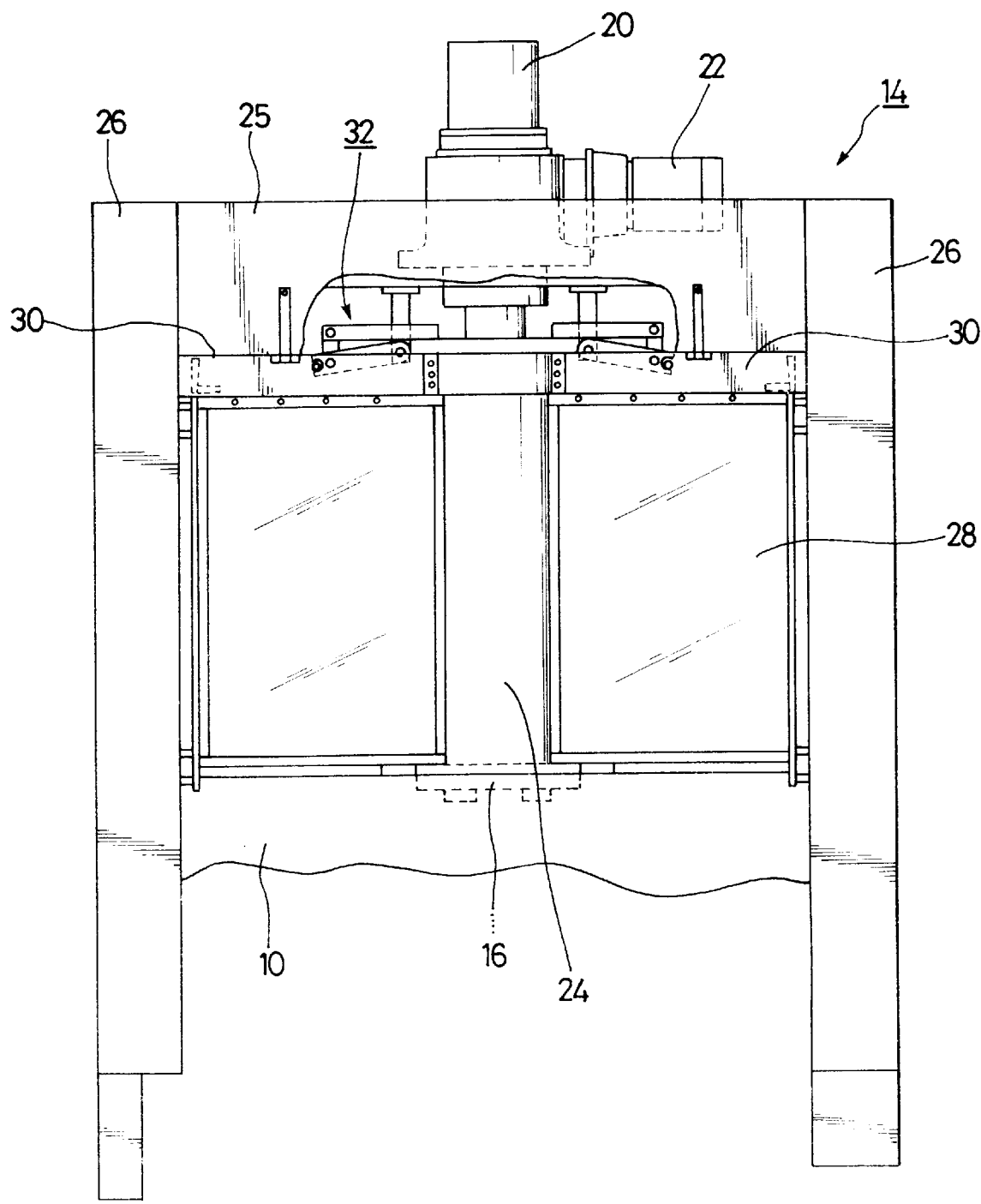
FIG. 1. is a partially cut away front elevational view showing a horizontal machining center which employs a splash guard device in accordance with the invention.
Figure 2:
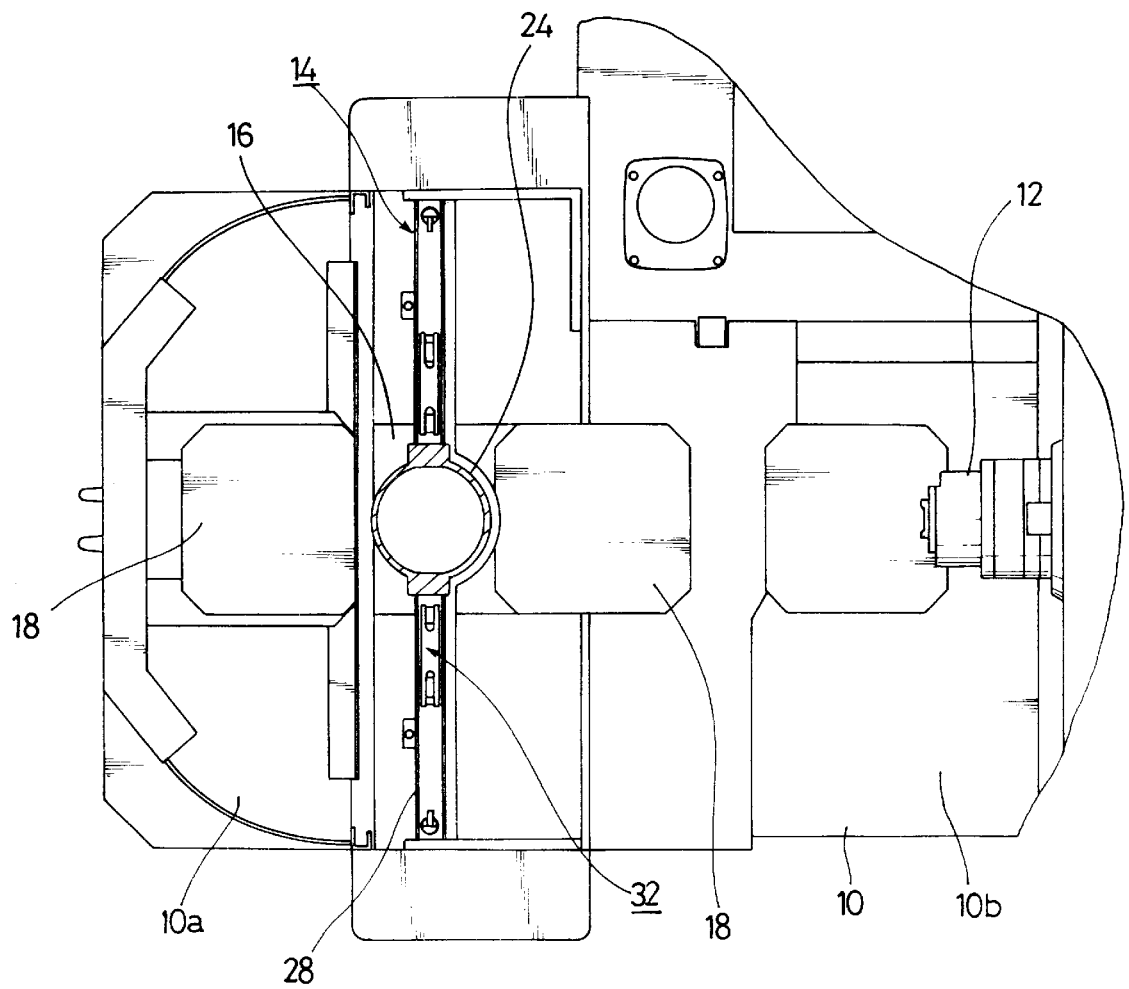
FIG. 2 is a partially cut away top view illustrating the horizontal machining center as shown in FIG. 1.

Referring first to FIGS. 1 and 2, it can be seen that, as an example of a machine tool, a horizontal machining center is shown to incorporate a splash guard device in accordance with the instant invention. The horizontal machining center comprises a bed 10 and a spindle head 12 adapted to hold a cutting tool not shown in the drawings. The bed 10 is bisected into a workpiece mounting area 10a and a workpiece machining area 10b by the splash guard device 14 of the invention, as best illustrated in FIG. 2.

A pallet changer 16 is provided underneath of the splash guard device 14 to change the position of workpiece supporting pallets 18 in a well-known manner before and after the cutting operation for one workpiece is carried out. As clearly shown in FIG. 1, the pallet changer 16 is drivingly connected to a hydraulic up/down cylinder 20 and and an electric swivel motor 22 by way of a vertical swivel shaft 24. In the course of pallet changing operation, the vertical swivel shaft 24 can be lifted up by means of the up/down cylinder 20 and subsequently swivelled 180° by virtue of the electric swivel motor 22 so that the pallet 18 located at the mounting area 10a is changed with the one placed at the machining area 10b.

Figure 3:
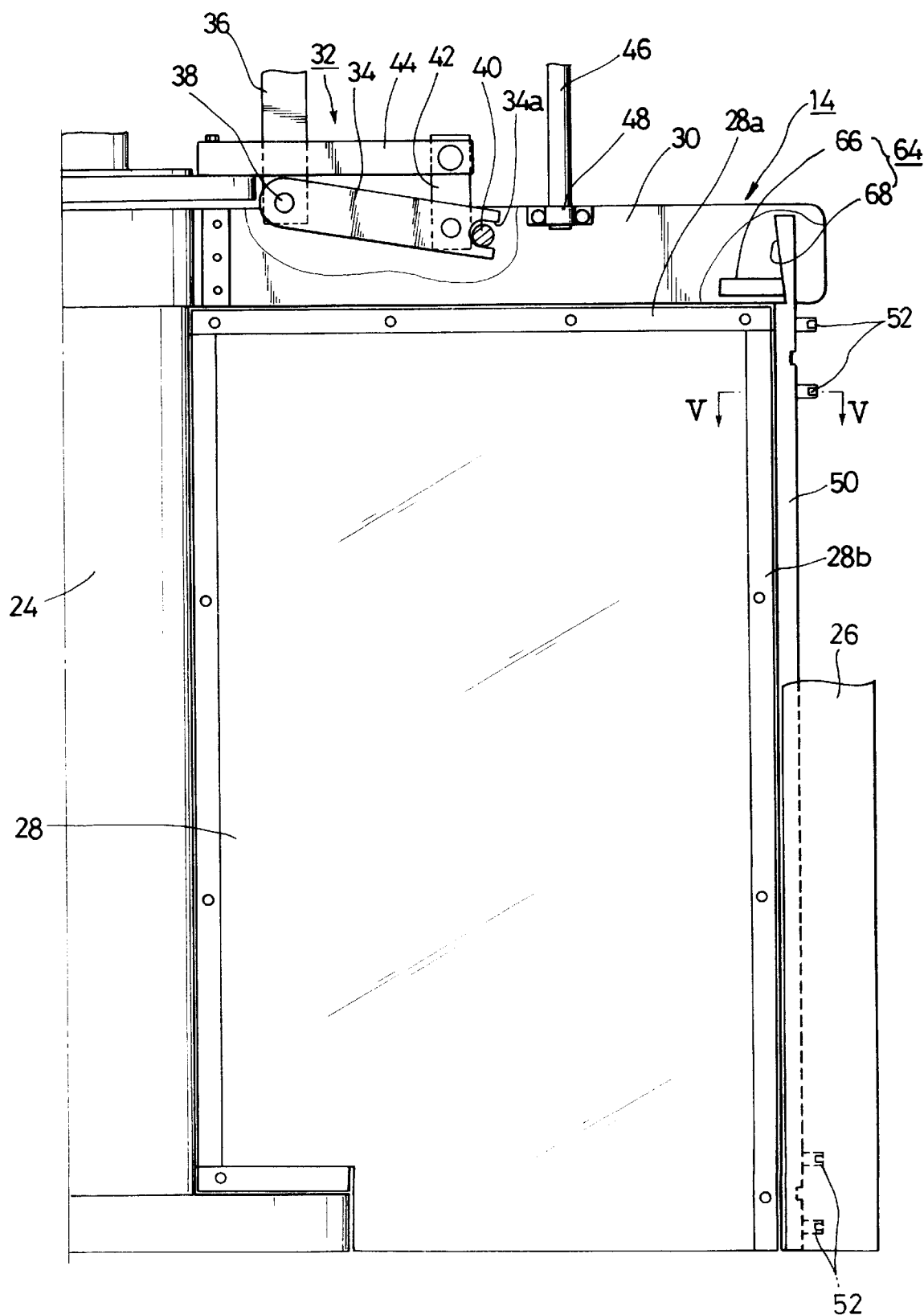
FIG. 3 is an enlarged view of the splash guard device in accordance with the invention, wherein a top sealing segment and a side sealing rod makes contact with the top and side edges of a splash guard door.

Referring to FIGS. 1 and 3, it will be noted that the splash guard device 14 comprises an overhead cover 25 and a pair of fixed side splash guard walls 26 which are attached at their top ends to the overhead cover 25. The splash guard device 14 further includes a transparent splash guard door 28 fixedly mounted to the vertical swivel shaft 24 for unitary up/down and swivel movement therewith. The splash guard door 28 has a top edge 28a and opposite side edges 28b extending in a spaced-apart parallel relationship with the fixed side splash guard walls 26.

A pair of elevationally movable top sealing segments 30 are disposed just above the splash guard door 28 in a symmetrical relationship with respect to the vertical swivel shaft 24 and movable independently of each other between a lowered position in which each of the top sealing segements 30 remains in contact with the top edge 28a of the splash guard door 28 and a raised position in which each of the top sealing segments 30 is spaced apart from the top edge 28a of the splash guard door 28.

The respective one of the top sealing segments 30 is operatively associated with the combination of vertical swivel shaft 24 and splash guard door 28 through the use of a linkage mechanism 32. As clearly shown in FIG. 3, the linkage mechanism 32 includes a swing arm 34 which has a proximal end pivotably secured to a vertical support bracket 36 for swinging movement about a pivot pin 38. The swing arm 34 is provided at its distal end with a generally U-shaped slot 34a which receives a cross pin 40 affixed to the top sealing segment 30. Furthermore, the swing arm 34 is connected at its intermediate extension to the vertical swivel shaft 24 and hence to splash guard door 28 via a vertical link 42 and a horizontal support bracket 44. It should be appreciated that the vertical link 42 is pivotally attached at its opposite ends to the swing arm 34 and the horizontal support bracket 44, respectively. Such a linkage mechanism 32 ensures that the upward movement of the vertical swivel shaft 24 and the splash guard door 28 leads to an amplified upward movement of the top sealing segment 30. The upward movement of the top sealing segment 30 is stabilized by the combined action of a guide rod 46 affixed to the overhead cover 25 and a guide bracket 48 secured to the top sealing segment 30 and slidably engaged with the guide rod 46.

Figure 4:
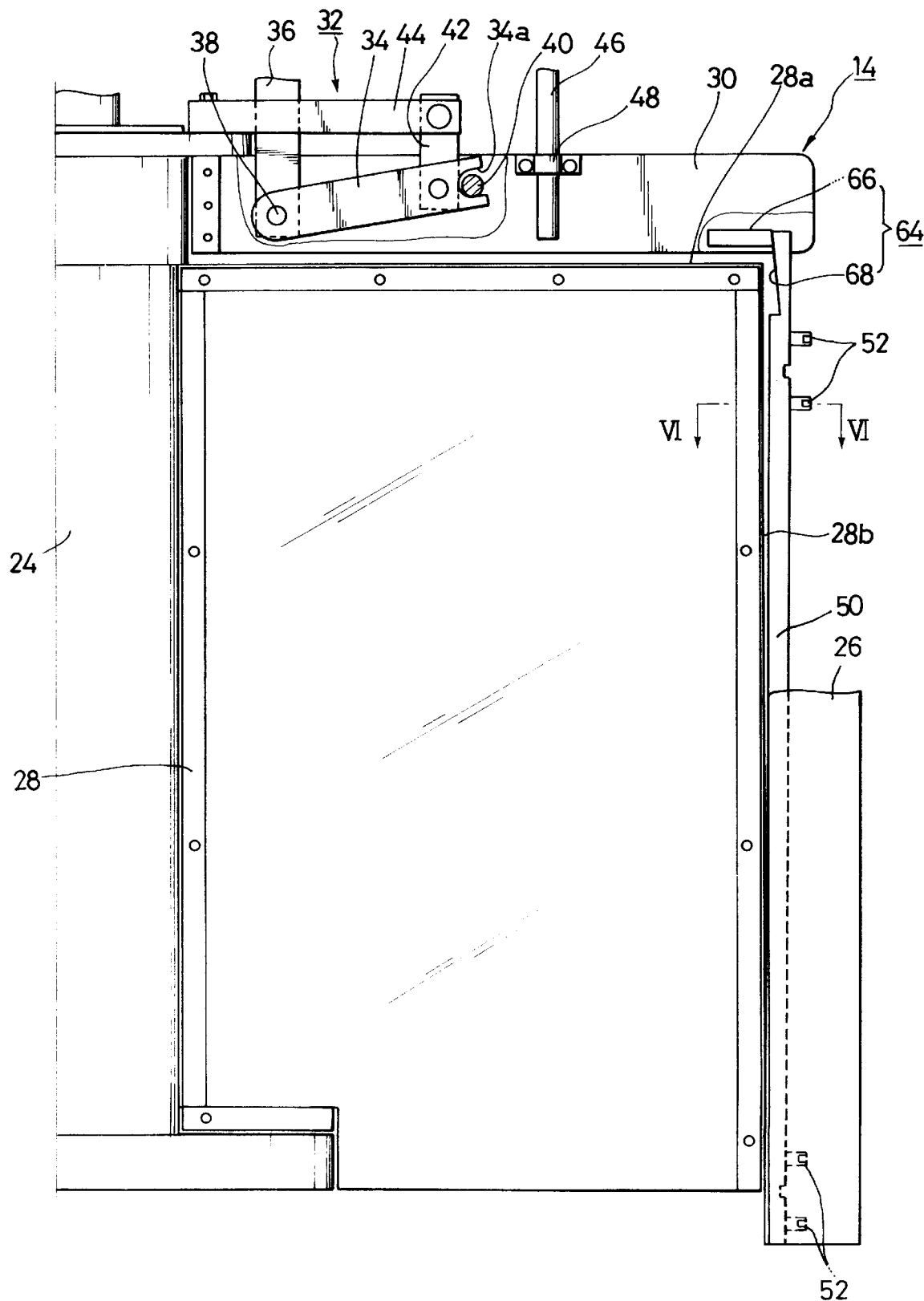
FIG. 4 is a view similar to FIG. 3 but showing the top sealing segment and the side sealing rod spaced apart from the top and side edges of the splash guard door which has moved upwards for pallet changing operation.
Figure 5:
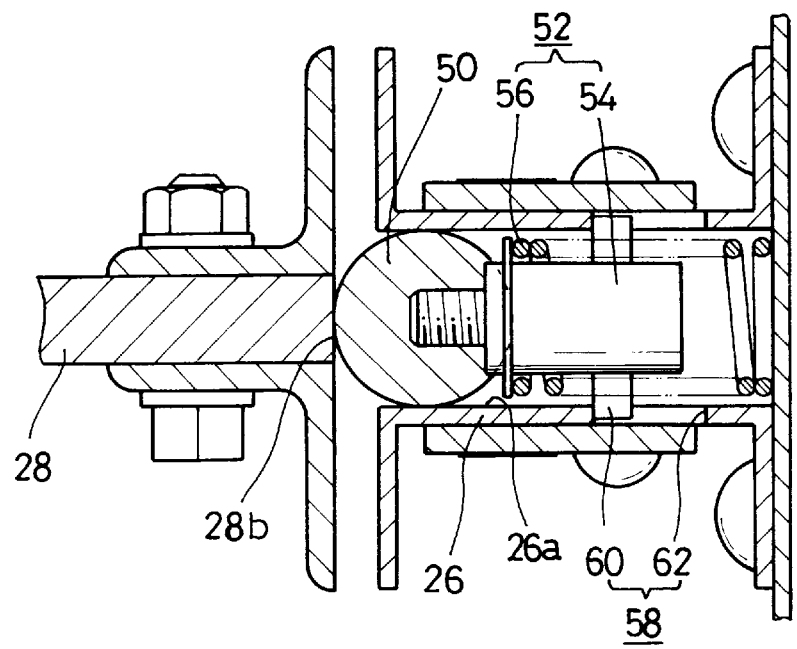
FIG. 5 is a cross-sectional view taken along line V—V in FIG. 3, showing the side sealing rod which remains in contact with the corresponding side edge of the splash guard door.

Referring collectively to FIGS. 3 through 5, it can be noted that an elongated side sealing rod 50 made of, e.g., steel, extends along the full length of the side edge 28b of the splash guard door 28. The side sealing rod 50 is slidably received in a channel 26a of the side splash guard wall 26, as best shown in FIG. 5, and laterally displaceable toward and away from the splash guard door 28 between an extended sealing position in which the side sealing rod 50 makes close contact with the side edge 28b of the splash guard door 28 and a retracted position in which the side sealing rod 50 is spaced apart from the side edge 28b of the splash guard door 28.

The side sealing rod 50 is resiliently urged toward the side edge 28b of the splash guard door 28 by means of, e.g., four, biasing devices 52 which are disposed along the top and bottom end portions in pair. As is apparent in FIGS. 5 and 6, each of the biasing device 52 comprises a spring retainer lug 54 projecting outwards from the side sealing rod 50 and a compression spring 56 retained on the spring retainer lug 54 in such a manner as to resiliently urge the side sealing rod 50 into contact with the side edge 28b of the splash guard door 28. The inward movement of the side sealing rod 50 beyond a predetermined limit is restrained by an extension restraint mechanism 58 which includes a stopper pin 60 fixedly secured to the spring retainer lug 54 and slidably engaged with a slot 62 of the side splash guard wall 26.

A motion converter arrangement 64 is employed to convert the upward movement of the top sealing segment 30 to lateral outward displacement of the side sealing rod 50, thereby bringing the side sealing rod 50 into the retracted position. As clearly shown in FIGS. 3 and 4, the motion converter arrangement 64 consists of a wedge block 66 fixedly attached to the top sealing segment 30 and a camming surface 68 provided at the top end portion of the side sealing rod 50. Constantly kept in contact with the wedge block, the camming surface 68 has an inclination angle e.g., six degrees to a vertical axis, so as to cause the side sealing rod 50 to move into the retracted position in response to the upward movement of the top sealing segment 30. While in the retracted position, the side sealing rod 50 is so inclined that a gap of gradually increasing width is left between the side edge 28b of the splash guard door 28 and the side sealing rod 50 to assure smooth swivelling movement of the splash guard door 28. The gap is greatest at the top of the side edge 28b of the splash guard door 28 and smallest at the bottom thereof.

Although the above description was made regarding the right half of the splash guard device, it should be understood that the left half of the splash guard device has a symmetrical structure and an identical operation with the right half, which justifies omission of description about the structure and operation of the left half of the splash guard device.

Figure 6:
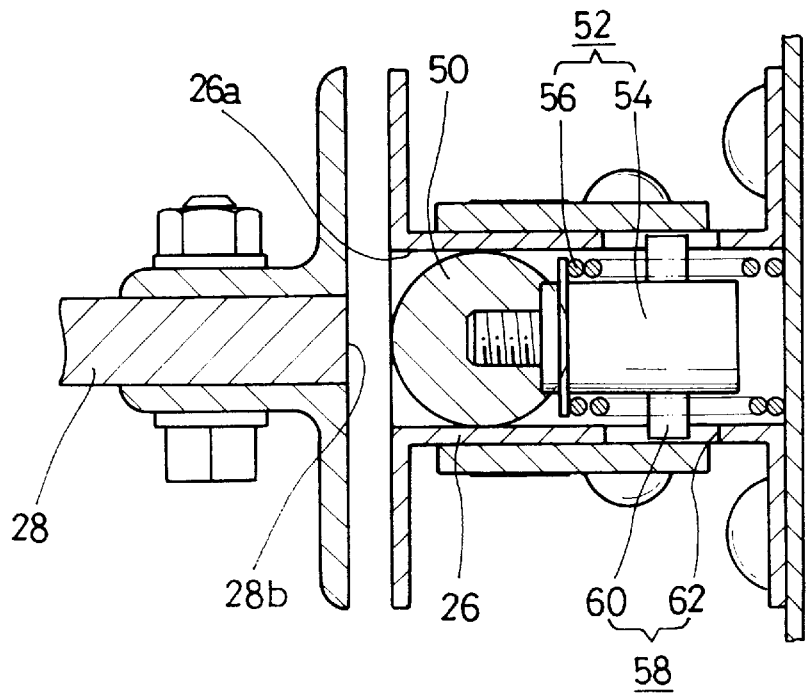
FIG. 6 is a cross-sectional view taken along line VI—VI in FIG. 4 illustrating the side sealing rod retracted away from the side edge of the splash guard door.

Operation of the splash guard device will now be set forth in detail with reference to FIGS. 1 and 6. During the workpiece cutting process, the splash guard door 28 are kept in a lower position, as shown in FIG. 3, in which position the top sealing segment 30 remains in contact with the top edge 28a of the splash guard door 28 and the side sealing rod 50 is resiliently urged into the extended position to make close contact with the side edge 28b of the splash guard door 28. This prevents chips and coolant from flying over the top and side edge 28a, 28b of the splash guard door 28, because no gap is present around the top and side edge 28a, 28b.

In order to change the pallets 18 before and after the workpiece cutting operation, the vertical swivel shaft 24 and the splash guard door 28 are lifted up through the use of the hydraulic up/down cylinder 20 as shown only in FIG. 1. The upward movement of the vertical swivel shaft 24 and the splash guard door 28 causes the swing arm 34 of the linkage mechanism 32 to be swung counterclockwise about the pivot pin 38, in response to which the top sealing segment 30 moves upwards a greater distance than the splash guard door 28 to thereby leave a gap of substantial width between the top edge 28a of the splash guard door 28 and the top sealing segment 30, as can be seen in FIG. 4. This is because the upward movement of the splash guard door 28 results in an amplified upward movement of the top sealing segment 30 by the linkage mechanism 32.

The amplified upward movement of the top sealing segment 30 is transmitted to the side sealing rod 50 via the motion converter mechanism 64. In other words, the wedge block 66 of the top sealing segment 30 pushes the camming surface 68 of the side sealing rod 50 as the top sealing segment 30 is subjected to upward movement. Accordingly, the side sealing rod 50 is caused to be laterally outwardly displaced against the biasing force of the compression spring 56 from the extended position as shown in FIGS. 3 and 5 into the retracted position as illustrated in FIGS. 4 and 6. This leaves a gap of substantial width between the side edge 28b of the splash guard door 28 and the side sealing rod 50.

Under the state shown in FIG. 4, the pallet 18 is changed by way of swivelling the vertical swivel shaft 24 and the splash guard door 28, at which time there would be no fear of physical interference between the splash guard door 28 and the environmental structure. At the end of the pallet changing operation, the vertical swivel shaft 24 and the splash guard door 28 are lowered down into the home position, in response to which the top sealing segment 30 is returnd back to the lowered position as shown in FIG. 3 to make contact with the upper edge 28a of the splash guard door 28. At the same moment, the side sealing rod 50 is returned back to the extended position by the biasing force of the compression spring 56 to make close contact with the side edge 28b of the splash guard door 28.

While the invention has been shown and described with reference to a preferred embodiment, it should be apparent to those skilled in the art that many changes and modifications may be made without departing from the scope of the invention as defined in the claims.

What is claimed is:

1. A splash guard device for use in a machine tool, comprising:

a splash guard door capable of up/down movement and swivellable about a vertical swivel axis, the door having a top edge and opposite side edges;

an elevationally movable top sealing member having a lowered position in which the top sealing member remains in contact with the top edge of the splash guard door and a raised position in which the top sealing member is spaced apart from the top edge of the splash guard door;

linkage means responsive to the upward movement of the splash guard door for causing the top sealing member to move from the lowered position into the raised position;

a pair of fixed side splash guard walls each extending in a spaced-apart parallel relationship with respect to the corresponding side edge of the splash guard door; and a pair of side sealing members each mounted on the respective one of the side splash guard walls and laterally displaceable toward and away from the splash guard door between an extended sealing position in which each of the side sealing members makes close contact with the corresponding side edge of the splash guard door and a retracted position in which each of the side sealing members is spaced apart from the corresponding side edge of the splash guard door.

2. The splash guard device for use in a machine tool as recited in claim 1, further comprising motion converter means for converting the elevational movement of the top sealing member to laterally outward displacement of the side sealing members to bring the side sealing members into the retracted position.

3. The splash guard device for use in a machine tool as recited in claim 2, further comprising means for resiliently biasing the side sealing members toward the extended position.

4. The splash guard device for use in a machine tool as recited in claim 2, wherein each of the side sealing members comprises an elongated rod extending along the full length of the side edges of the splash guard door and having a top end portion projecting through the top sealing member.

5. The splash guard device for use in a machine tool as recited in claim 4, wherein the motion converter means comprises a wedge block fixedly attached to the top sealing member and a camming surface provided at the top end portion of the elongated rod, the camming surface remaining in contact with the wedge block and having such an inclination angle as to cause the elongated rod to move laterally outwardly into the retracted position in response to the upward movement of the top sealing member.

6. The splash guard device for use in a machine tool as recited in claim 3, wherein the biasing means comprises a spring retainer lug projecting outwards from the respective one of the side sealing members and a compression spring retained on the spring retainer lug so as to resiliently urge the respective one of the side sealing members into contact with the corresponding side edge of the splash guard door.

7. The splash guard device for use in a machine tool as recited in claim 6, further comprising extension restraint means for inhibiting the side sealing members from inward extending movement beyond a predetermined limit.

8. The splash guard device for use in a machine tool as recited in claim 7, wherein the extension restraint means comprises a stopper pin fixedly secured to the spring retainer lug and slidably engaged with the respective one of the side splash guard walls.

9. The splash guard device for use in a machine tool as recited in claim 1, wherein the top sealing member comprises a pair of independently movable top sealing segments disposed symmetrically with respect to the vertical swivel axis, and further comprising an overhead cover provided above the top sealing segments.

10. The splash guard device for use in a machine tool as recited in claim 9, wherein the linkage means comprises a swing arm having a proximal end pivotably attached to the overhead cover, a distal end engaged with the respective one of the top sealing segments and an intermediate extension pivotally connected to the splash guard door, whereby the upward movement of the splash guard door can cause an amplified upward movement of the top sealing segments so as to leave a gap between the top edge of the splash guard door and the top sealing segments at the termination of the upward movement of the splash guard door.

11. The splash guard device for use in a machine tool as recited in claim 10, further comprising means for guiding the elevational movement of the top sealing segments, the guiding means provided with a guide rod affixed to the overhead cover and a guide bracket secured to the respective one of the top sealing segments and slidably engaged with the guide rod.

* * * * *